United States Patent
Nakamura

[19]

[11] Patent Number: 6,054,069

[45] Date of Patent: Apr. 25, 2000

[54] METHOD OF MANUFACTURING A PREFORM FOR A REFRACTIVE INDEX DISTRIBUTED TYPE PLASTIC OPTICAL FIBER

[75] Inventor: Tetsuya Nakamura, Yokkaichi, Japan

[73] Assignee: Sumitomo Wiring Systems, Ltd., Yokkaichi, Japan

[21] Appl. No.: 09/167,573

[22] Filed: Oct. 7, 1998

[30] Foreign Application Priority Data

Oct. 14, 1997 [JP] Japan .................................. 9-280377

[51] Int. Cl.⁷ ...................................................... B29D 11/00
[52] U.S. Cl. ........................................... 264/1.24; 264/2.1
[58] Field of Search .................................. 264/1.1, 1.24, 264/1.29, 1.27, 1.7, 2.1, 310

[56] References Cited

U.S. PATENT DOCUMENTS

| | | | |
|---|---|---|---|
| 3,718,383 | 2/1973 | Moore ...................................... | 264/1.7 |
| 5,541,247 | 7/1996 | Koike . | |
| 5,614,253 | 3/1997 | Nonaka et al. . | |
| 5,639,512 | 6/1997 | Nonaka et al. . | |

FOREIGN PATENT DOCUMENTS

| | | |
|---|---|---|
| 61-130904 | 6/1986 | Japan . |
| 63-218903 | 9/1988 | Japan . |
| 5-60931 | 3/1993 | Japan . |
| 5-173026 | 7/1993 | Japan . |
| 6-186442 | 7/1994 | Japan . |
| 7-13029 | 1/1995 | Japan . |
| 7-27928 | 1/1995 | Japan . |
| 7-5329 | 1/1995 | Japan . |
| 9-218311 | 8/1997 | Japan . |
| 9-218312 | 8/1997 | Japan . |
| WO 87/01075 | 2/1987 | WIPO .................................. 264/1.27 |
| 93/08488 | 4/1993 | WIPO . |

OTHER PUBLICATIONS

English Language Abstract of JP No. 7–27928.
English Language Abstract of JP No. 7–5329.
English Language Abstract of JP No. 7–13029.
English Language Abstract of JP No. 6–186442.
English Language Abstract of JP No. 5–60931.
English Language Abstract of JP No. 9–218311.
English Language Abstract of JP No. 9–218312.
English Language Abstract of JP No. 63–218903.
English Language Abstract of JP No. 61–130904.

*Primary Examiner*—Mathieu D. Vargot
*Attorney, Agent, or Firm*—Greenblum & Bernstein, P.L.C.

[57] ABSTRACT

A preform having a core and a cladding portion is prepared for a refractive index-distributed type plastic optical fiber. The fiber obtained has a large difference in refractive index between the central and peripheral zone of the core portion. This suppresses light propagation modes in the cladding portion, a cause of deteriorated transmission characteristics, without raising the concentration of non-polymerizable compounds contained in the core portion. To manufacture the preform, a cylindrical vessel is prepared from a polymer, which serves as cladding portion. The inner surface of the preform is then provided with a polymer-containing layer having a refractive index lower than that of the polymer used for the core portion, so as to leave a cavity inside this vessel. This cavity is then filled with a monomer, which is subsequently polymerized while dissolving the lower-refractive index, polymer-containing layer, so as to form the core portion.

16 Claims, 1 Drawing Sheet

METHOD OF MANUFACTURING A PREFORM FOR A REFRACTIVE INDEX DISTRIBUTED TYPE PLASTIC OPTICAL FIBER

BACKGROUND OF THE INVENTION

1. Field of the Invention

The present invention relates to a plastic optical fiber having a distributed refractive index. More particularly, the invention relates to a method of manufacturing a preform used for the production of a refractive index-distributed type plastic optical fiber. The preform thus prepared has a core and a cladding portion. The invention concerns a method of preform preparation, by virtue of which the core portion has a different refractive index between its central and peripheral zone, and in particular, the refractive-index distribution is not flattened near the central zone of the core.

2. Description of Background Information

An example of such a method is disclosed in Japanese Patent Application, published under the number Sho 61-130 904, according to which a cylindrical polymer vessel is prepared and serves as a cladding portion and then a monomer solution is put therein and polymerized and hardened so as to form a core portion. As a feature of this method, when monomer methyl methacrylate (MMA), for example, is to be used as the main monomer, a mixed solution of the monomer MMA with another monomer having a lower reactivity than the monomer MMA and a higher refractive index than a poly(methyl methacrylate) (PMMA) is used as solution for forming a core portion. In this method, the higher reactivity monomer MMA starts to polymerize from the inner surface of the cylindrical polymer vessel, whereas the lower reactivity monomer tends to copolymerize towards the center zone of the core portion, so that the refractive index thereof is graded.

Another method for manufacturing a preform for a plastic optical fiber is described in Japanese Patent Application published under the number Hei 5-173 026. According to this method, a cylindrical polymer vessel is first prepared as a cladding portion. Then, a monomer solution is polymerized and solidified inside the cylindrical vessel to form a core portion. Then, a monomer solution is polymerized and solidified inside the cylindrical vessel to form a core portion. As described in the above-mentioned Publication Sho 61-130 904, polymerization is propagated from the inner surface of the cylindrical vessel toward the center zone, in view of forming a continuously varying refractive index distribution. The feature of this method, however, is to use a second component that is a polymerizable compound having a larger molecular size than that of the first component monomer. As the polymerization starts from the inner surface of the tube, the second monomer component having a larger molecular size is pushed towards the center zone, thereby forming a higher density onwards, and thus grading the refractive index.

Also in the method disclosed in the application under the number WO 93/08 488, a monomer is polymerized from the inner surface of a cylindrical vessel consisting of a polymer, in view of forming a graded refractive index therein. For example, a cylindrical vessel is made of a PMMA tube and a core portion is formed inside the cavity of the PMA tube. The PMMA tube is prepared by putting a MMA monomer solution into a glass tube and polymerizing the monomer under heat while rotating the glass tube. To prepare a core portion, a MMA monomer solution containing a non-polymerizable compound is put into the PMMA tube and polymerized at heat under rotation. A preform having a graded index is thus obtained. The preform obtained is heat-melted and drawn, to obtain an optical fiber having a predetermined diameter.

The process disclosed in the Application WO 93/08 488 has a common point to the above-mentioned two Japanese Patent Applications, in that a polymer tube serves as a cladding portion, inside which there is formed a core portion having a continuously varying refractive index. The only difference is that a non-polymerizable compound is used in order to form a refractive index grading inside the core. When a monomer solution as a starting material for the core portion is put into the cylindrical polymer vessel, the monomer partially dissolves the inner surface of the polymer tube. Due to the gel effect, the polymerization propagates from the inner surface, where the viscosity becomes higher, to the center zone. The nearer the position to the center zone is, the higher the concentration of the non-polymerizable, high-refractive-index compound is. The refractive index is thus continuously graded. As for the polymer forming a cylindrical vessel for cladding portion, it must be formed partially or mostly from the same monomer as that for the core portion, and be soluble in the monomer solution which serves as the starting material for the core portion.

The method disclosed in the Application WO 93/08 488 is more suitable than the methods according to the other two published Applications, in that the finally obtained fiber has a smaller transmission loss. In the latter methods, as the core portion is made of a copolymer, a micro-phase separation may occur corresponding to the chain distribution of two components. This causes an increase of transmission loss. Especially, in the method described in Application Sho 61-130 904, a low-reactivity monomer is concentrated near the core center zone and remains there non-reacted due to its low reactivity. On the other hand, in the method described in WO 93/08 488, the polymer constituting the core portion is a single polymer which contains a non-polymerizable compound. Consequently, there may occur no micro-phase separation due to the chain distribution. The transmission loss may thus be minimized.

In the method disclosed in the Application WO 93/08 488, the difference An in refractive index between the center zone and peripheral zone of the core portion depends on the concentration of non-polymerizable compounds in the core-portion polymer. To increase the difference An in refractive index, the concentration of non-polymerizable compounds must be raised. However, if the concentration of the non-polymerizable compounds, which are in liquid state, is increased, the glass transition temperature of the polymer is lowered and the polymer is plasticized. Then, the distribution of refractive index in the core portion is flattened, leading to a quasi-absence of refractive index distribution and the reduction of transmission band area.

As shown in Table 1, the glass transition temperature of PMMA varies depending on the concentration of diphenyl-sulfide as a non-polymerizable compound.

TABLE 1

| Concentration of the non-polymerizable compound (wt %) | glass transition temperature (° C.) |
| --- | --- |
| 0 | 100 |
| 5 | 87 |
| 10 | 75 |
| 15 | 66 |

TABLE 1-continued

| Concentration of the non-polymerizable compound (wt %) | glass transition temperature (° C.) |
|---|---|
| 20 | 59 |
| 25 | 42 |
| 30 | 31 |

A plastic optical fiber has a core diameter greater than that of a quartz-type optical fiber, so that the former has more propagation modes than the latter. Light propagation modes in the cladding portion (cladding mode) or near the interface core portion/cladding portion, narrow the area of propagation band and render other features less stable. These modes should therefore be reduced or removed. In order to reduce the cladding mode, the cladding layer must be made thinner. This means, if applied to the prior art, that the wall thickness of the cylindrical polymer vessel, used when preparing a preform, must be made thinner. However, this will render manufacturing of the preform more difficult.

SUMMARY OF THE INVENTION

An object of the present invention is therefore to provide a method of manufacturing a preform for a graded refractive-index-type plastic optical fiber, according to which the difference in refractive index between the central zone and the peripheral zone of the core portion is increased without raising the concentration of non-polymerizable compounds in the core portion and the light propagation in cladding mode, prone to deteriorate the transmission features, can be reduced or removed.

To this end, there is provided a method of preparing a preform used for the manufacture of a refractive index-distributed type plastic optical fiber, the preform having a cladding portion and a core portion, each portion including a cladding polymer and a core polymer correspondingly, the method including the steps of:

preparing a cylindrical vessel from the cladding polymer so as to form the cladding portion;

forming a polymer-containing layer having a refractive index lower than that of the core polymer on the inner surface of the cylindrical vessel, thereby forming a cavity inside the vessel;

filling the cavity of the cylindrical vessel containing the lower-refractive-index layer with a monomer forming the core polymer; and polymerizing the monomer while dissolving the low-refractive-index layer, so as to form the core portion.

The cylindrical vessel may be prepared by putting a monomer into a cylindrical receptacle for polymerization and the receptacle is maintained horizontally and rotated, whereby the monomer is polymerized.

In one aspect of the invention, the polymer-containing layer having a lower refractive index may be formed from the same polymer as the core polymer and contain a non-polymerizable compound having a low refractive index.

In another aspect of the invention, the polymer-containing layer having a lower refractive index may be formed from a polymer having a refractive index lower than that of the core polymer.

In still another aspect, the polymer-containing layer having a lower refractive index may be formed from a copolymer including a monomer giving rise to the core polymer and a monomer giving rise to a polymer which has a lower refractive index than the core polymer.

In any of the above cases, the core polymer may be prepared by mixing the same monomer as one used for the cladding polymer with a non-polymerizable compound having a high refractive index.

Typically, a polymer-containing layer, that has a refractive index lower than that of a pure polymer constituting a core portion, is first formed on the inside surface of the cylindrical polymer vessel for cladding portion. Then, the space of the cylindrical vessel, provided with the low-refractive-index layer, is filled with a monomer for constituting the core portion. The monomer is polymerized whilst dissolving the low refractive index layer, so that the core portion is formed.

BRIEF DESCRIPTION OF THE DRAWINGS

The above and other objects, features and advantages of the present invention will be made apparent from the following description of the preferred embodiments, given as a non-limiting example, with reference to the accompanying drawings, in which.

DETAILED DESCRIPTION OF THE PREFERRED EMBODIMENTS

Figure 2:
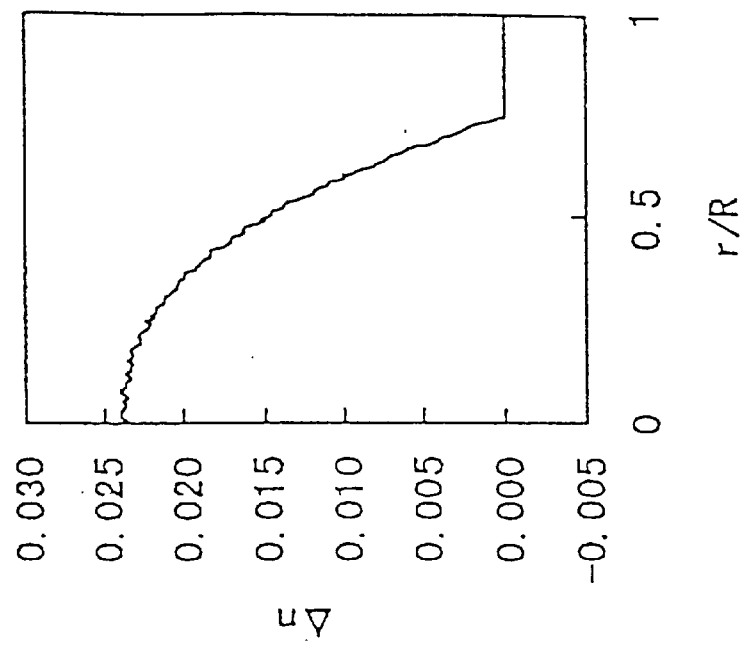
FIG. 2 shows a refractive index distribution in the optical fiber manufactured from the preform obtained in Comparative Example 1.

In the method of the present invention, a cladding portion having the form of a cylindrical vessel is first prepared. Its manufacturing method is not particularly limited. Usually, a monomer is put into a cylindrical receptacle for polymerization. The receptacle is maintained horizontally and rotated. The receptacle for polymerization is usually made of glass, but it may be of a metal or other materials. The receptacle size can be determined appropriately, according to the desired size of the preform to be formed. Otherwise, a cylindrical cladding portion can be formed by hollowing out a cylindrical polymer column. The cylindrical cladding can also be made by extrusion of a polymer.

As a polymer for cladding portion, highly transparent colorless plastics, already known and used for plastic optical fibers, can be used. As a monomer giving rise to such plastic, the following groups of compounds respectively belonging to methacrylates, styrene-based compounds, fluoroacrylates, fluoromethacrylates, or the like, may be used, but the present invention is not limited thereto:

(a) group of methacrylates and acrylates;
methyl methacrylate, ethyl methacry late, isopropyl methacrylate, t-butyl methacry late, benzyl methacrylate, phenyl methacrylate, cyclohexyl methacrylate, diphenylmethyl methacrylate, etc.; methyl acrylate, ethyl acrylate, t-butyl acrylate, phenyl acrylate, etc.;

(b) group of styrene-based compounds;
styrene, α-methylstyrene, chlorostyrene, bromostyrene, dichlorostyrene, dibromostyrene, etc.;

(c) group of fluoroacrylates;
2,2,2-trifluoroethyl acrylates, etc.;

(d) group of fluoromethacrylates;
1,1,2-trifluoroethyl methacrylate, etc.

A polymerization initiating agent and a desired additive such as a chain transfer compound are added to any of the above-mentioned monomers and an appropriate amount of the mixture is put into a polymerization receptacle. The receptacle is rotated by a motor and heated, so that the monomer is polymerized on the inner surface of the receptacle to obtain a cladding portion. In order to adjust the refractive index of the cladding portion, a non-polymerizable high-refractive-index compound, such as the one used for the core portion, may be added into this receptacle. The amount of the monomer to be used may be determined depending on the capacity of the receptacle and the thickness of the cladding portion. If desired, an excess quantity of monomer may be used: when the desired thickness of the cladding portion is attained, polymerization is stopped and the excess monomer is removed from the receptacle.

The cylindrical polymer vessel forming the cladding portion is then provided, on its inner surface, with a layer having a refractive index lower than that of a pure polymer forming the core portion. This lower-refractive index layer may include, for example: (1) the same polymer as that of the core portion, but including a non-polymerizable low-refractive index compound; (2) a polymer having a refractive index lower than that of the core-portion polymer; (3) a copolymer made up of a monomer giving rise to the core-portion polymer and of a monomer giving rise to a polymer having a lower-refractive index than that of the core-portion polymer.

To prepare the layer, a suitable monomer alone, or with a non-polymerizable low-refractive index compound, is put into a cylindrical polymer vessel which constitutes the cladding portion. The monomer or the mixture is polymerized by rotating the vessel. When the low refractive index layer attains a predetermined thickness, the polymerization is stopped and the non-reacted monomer is removed from the vessel.

A non-polymerizable compound having a low refractive index may be chosen depending on the type of polymer to be used. The chemical structure or molecular weight of the non-polymerizable compound is not particularly limited. For example, when PMMA polymer is used, such a non-polymerizable compound as a dibasic ester of an acid, e.g., dibutyl sebacate, or a fatty acid ester, e.g., ethyl stearate, etc., can be used.

A non-polymerizable, low-refractive-index compound lowers the glass transition temperature of the polymer. The concentration of the non-polymerizable, low-refractive-index compound must therefore be adjusted so as to avoid an excessively low glass transition temperature. The concentration is in practice determined depending on the desired refractive index distribution and/or refractive index difference.

The type of polymer having a refractive index lower than that of the core-portion polymer, or the type of monomer giving rise to a copolymer, may be chosen depending on the type of polymer used for the core portion.

When forming the core portion, the polymer or copolymer constituting a low refractive index layer must be soluble in the monomer which gives rise to the core-portion polymer. Consequently, those polymers or copolymers which have the same levels of solubility parameter as the monomer and polymer for the core portion and are compatible therewith, are preferably used.

The core portion is formed as the last step. The starting solution for forming the core-portion polymer is prepared by mixing a monomer, usually the same monomer as the one used for forming the cladding portion, and a non-polymerizable high-refractive index compound.

Such a non-polymerizable compound is a colorless transparent compound having a high boiling point, liquid at above room temperature, and compatible with the core-portion polymer. Examples of such a compound include a benzoate such as benzyl benzoate; a sebacate or other esters of dibasic alkanoic acid such as dibutyl sebacate; a phthalates such as dimethyl phthalate and dioctyl phthalate; a halo compound such as bromobenzene and a sulfide compound such as diphenyl sulfide.

Further, a polymerization initiator, a chain transfer agent or the like is added to the above mixture of the monomer and a non-polymerizable compound. The total mixture thus obtained is put into the polymerization receptacle which includes a cladding portion and a low refractive index layer. The receptacle is heated under rotation, to obtain a polymerized product. When the core portion attains a predetermined thickness and the ratio of non-reacted monomer becomes less than about 10%, preferably less than about 5%, of the total mixture, polymerization is stopped.

During the core formation, the low-refractive index layer is dissolved into the monomer solution which gives rise to the core portion. Accordingly, the peripheral zone of the core portion has a lower refractive index than the central zone thereof, resulting in the greater difference in refractive index between both zones.

In the present invention, a low-refractive index layer is primarily formed inside the cladding portion and the core portion is formed while dissolving this layer. In this manner, the refractive index is differentiated between the central zone and the peripheral zone of the core portion. Further, as the refractive index of the cladding portion is raised, the light propagation modes in the cladding portion can be reduced or removed.

EXAMPLE 1

A solution was prepared by adding 0.1% by weight of benzoyl peroxide as polymerization initiator and 0.2% by weight of n-butyl mercaptan as chain transfer agent to monomer The solution was put into a cylindrical polymerization receptacle having an inner diameter of 20 mm. The receptacle was maintained horizontally and rotated at a speed of 2000 r.p.m. at 80° C. for 20 hours, to yield a polymerized cladding portion. The thickness of the cladding portion obtained was 3.0 mm and the refractive index of PMMA obtained was 1.492.

MMA monomer was mixed with 0.1% by weight of benzoyl peroxide, 0.2% by weight of n-butyl mercaptan and 7% by weight of dibutyl sebacate (refractive index: 1.436). The mixture thus prepared was put into the cavity of the polymerization receptacle. Polymerization was performed under the same conditions as those for the cladding portion formation, so as to give a low-refractive-index layer. The thickness of this portion was 1.8 mm.

MMA monomer was mixed with 0.1% by weight of benzoyl peroxide, 0.2% by weight of n-butyl mercaptan and 10% by weight of diphenyl sulfide. The mixture obtained was put into the cavity of the polymerization receptacle. The receptacle was shut, maintained horizontally and rotated at a speed of 5 r.p.m. at 90° C. for 20 hours, to yield a core portion. The glass transition temperature of the core portion was 63° C.

The above-mentioned polymerization procedure gives rise to a preform. The preform obtained was drawn into a fiber having a diameter of 750 μm. When measured by "cutback method" (measuring the optical loss caused by a fiber of 5 m and two end connectors; subtracting the one caused by 1 m and the two end connectors therefrom; and dividing the resulting figure by 4, to give the optical loss caused by one-meter fiber per se), the transmission loss was 162 dB/km at a wavelength of 650 nm.

Figure 1:
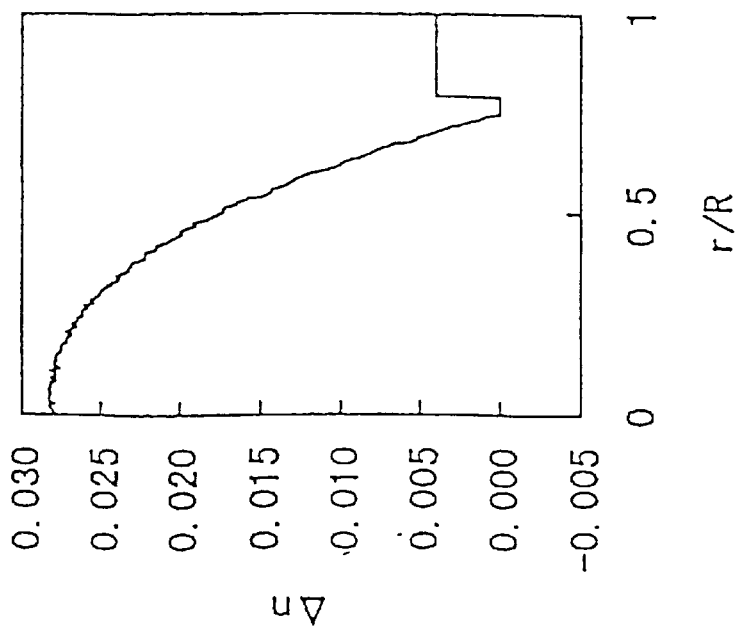
FIG. 1 shows a refractive index distribution in the optical fiber manufactured from the preform obtained in Example 1.

Refractive index distribution in the fiber was measured by using a shearing interference microscope. The result is shown in FIG. 1. The difference in refractive index (Δn) between the central zone and the peripheral zone of the core portion was 0.028.

COMPARATIVE EXAMPLE 1

To monomer MMA were added 0.1% by weight of benzoyl peroxide as polymerization initiator and 0.2% by weight of n-butyl mercaptan as chain transfer agent, to give a mixture solution. The solution thus obtained was put into a cylindrical receptacle having an inner diameter of 20 mm. The receptacle was shut, maintained horizontally and rotated at a speed of 2000 r.p.m. at 80° C. for 20 hours, to yield a cladding portion, the thickness of which was 4 mm.

MMA monomer was mixed with 0.1% by weight of benzoyl peroxide, 0.2% by weight of n-butyl mercaptan and 17% by weight of diphenyl sulfide to give a mixture. The mixture was put into the cavity of the receptacle. The receptacle was shut, maintained horizontally and rotated at a speed of 5 r.p.m. at 90° C. for 20 hours, to yield a polymerized core portion, the glass transition temperature of which was 62° C.

The above polymerization gives rise to a preform. The preform thus obtained was drawn into a fiber having a diameter of 750 μm. When measured, by "cutback method", the transmission loss was 161 dB/km at a wavelength of 650 nm.

Refractive index distribution in the fiber was measured by using a shearing interference microscope. The result is shown in FIG. 2. The difference in refractive index (Δn) between the central zone and the peripheral zone of the core portion was 0.025.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 9-280377 filed on Oct. 14, 1997, which is herein expressly incorporated by reference in its entirety.

What is claimed:

1. A method of preparing a preform used for the manufacture of a refractive index-distributed plastic optical fiber, said preform having a cladding portion and a core portion, wherein the core portion has a different refractive index between central and peripheral zones thereof, each portion comprising a cladding polymer and a core polymer respectively, said method comprising the steps of:

preparing a cylindrical vessel from said cladding polymer so as to form said cladding portion;

forming a polymer-containing layer having a refractive index lower than that of said core polymer on the inner surface of said cylindrical vessel, thereby forming a cavity inside said vessel;

filling said cavity of said cylindrical vessel containing said lower-refractive index layer with a monomer forming said core polymer; and polymerizing said monomer while dissolving said low-refractive index layer, so as to form said core portion.

2. The method according to claim 1, wherein said cylindrical vessel is prepared by putting a monomer into a cylindrical receptacle for polymerization and said receptacle is maintained horizontally and rotated, whereby said monomer is polymerized.

3. The method according to claim 1, wherein said polymer-containing layer having a lower refractive index is formed from the same polymer as said core polymer and contains a non-polymerizable compound having a low refractive index.

4. The method according to claim 2, wherein said polymer-containing layer having a lower refractive index is formed from the same polymer as said core polymer and contains a non-polymerizable compound having a low refractive index.

5. The method according to claim 1, wherein said polymer-containing layer having a lower refractive index is formed from a polymer having a refractive index lower than that of said core polymer.

6. The method according to claim 2, wherein said polymer-containing layer having a lower refractive index is formed from a polymer having a refractive index lower than that of said core polymer.

7. The method according to claim 1, wherein said polymer-containing layer having a lower refractive index is formed from a copolymer comprising a monomer giving rise to said core polymer and a monomer giving rise to a polymer which has a lower refractive index than said core polymer.

8. The method according to claim 2, wherein said polymer-containing layer having a lower refractive index is formed from a copolymer comprising a monomer giving rise to said core polymer and a monomer giving rise to a polymer which has a lower refractive index than said core polymer.

9. The method according to claim 1, wherein said core polymer is prepared by mixing the same monomer as the one used for said cladding polymer with a non-polymerizable compound having a high refractive index.

10. The method according to claim 2, wherein said core polymer is prepared by mixing the same monomer as the one used for said cladding polymer with a non-polymerizable compound having a high refractive index.

11. The method according to claim 3, wherein said core polymer is prepared by mixing the same monomer as the one used for said cladding polymer with a non-polymerizable compound having a high refractive index.

12. The method according to claim 4, wherein said core polymer is prepared by mixing the same monomer as the one used for said cladding polymer with a non-polymerizable compound having a high refractive index.

13. The method according to claim 5, wherein said core polymer is prepared by mixing the same monomer as the one used for said cladding polymer with a non-polymerizable compound having a high refractive index.

14. The method according to claim 6, wherein said core polymer is prepared by mixing the same monomer as the one used for said cladding polymer with a non-polymerizable compound having a high refractive index.

15. The method according to claim 7, wherein said core polymer is prepared by mixing the same monomer as the one used for said cladding polymer with a non-polymerizable compound having a high refractive index.

16. The method according to claim 8, wherein said core polymer is prepared by mixing the same monomer as the one used for said cladding polymer with a non-polymerizable compound having a high refractive index.

* * * * *